United States Patent [19]

Wright, Jr.

[11] 4,094,304

[45] June 13, 1978

[54] METHOD AND APPARATUS FOR MEASUREMENT OF ACOUSTIC IMPEDANCE TRANSITIONS IN MEDIA SUCH AS HUMAN BODIES

[75] Inventor: Hubert A. Wright, Jr., Lexington, Mass.

[73] Assignee: Bolt Beranek and Newman Inc., Cambridge, Mass.

[21] Appl. No.: 494,907

[22] Filed: Aug. 5, 1974

Related U.S. Application Data

[63] Continuation of Ser. No. 298,027, Oct. 16, 1972, abandoned.

[51] Int. Cl.² ............................................. A61B 10/00
[52] U.S. Cl. ..................... 128/2 V; 73/574; 128/2.05 Z
[58] Field of Search ............. 128/2.05 Z, 2.05 F, 128/2 V, 2 R, 2.1 Z, 24 A; 340/15.5 CC, 7 R; 73/67.1, 67.9, 574

[56] References Cited

U.S. PATENT DOCUMENTS

| | | | |
|---|---|---|---|
| 3,088,541 | 5/1963 | Alexander et al. ............... | 181/0.5 T |
| 3,156,110 | 11/1964 | Clynes ............................. | 128/2 V X |
| 3,640,271 | 2/1972 | Horton ............................ | 128/2.05 F |
| 3,690,158 | 9/1972 | Lichtenstein .................... | 128/2 V X |
| 3,695,252 | 10/1972 | Gordon ........................... | 128/2 V |
| 3,830,223 | 8/1974 | Beretsky et al. ................. | 128/2 V |

OTHER PUBLICATIONS

Kikuchi, Y. et al., Japan Electronic Engnrg, Oct. 1970, pp. 53–60.

*Primary Examiner*—Kyle L. Howell
*Attorney, Agent, or Firm*—Rines and Rines, Shapiro and Shapiro

[57] ABSTRACT

Acoustic impedance transitions in human or animal bodies or other media are measured for identification and diagnostic purposes by exposing the body to acoustic energy pulses to produce echo pulses which are detected. The echo pulses are processed to indicate the relative specific acoustic impedance of the exposed body as a function of the time/distance relationship of the echo pulses relative to the medium, thereby to enable the determination of the relative extent and position of irregularities in the body, for example.

17 Claims, 9 Drawing Figures

METHOD AND APPARATUS FOR MEASUREMENT OF ACOUSTIC IMPEDANCE TRANSITIONS IN MEDIA SUCH AS HUMAN BODIES

This is a continuation of Application Ser. No. 298,027, filed Oct. 16,1972, now abandoned.

The present invention relates to methods of and apparatus for radiant energy measurement of impedance transitions (continuous and discontinuous) in human or animal bodies, for identification and related purposes, being more particularly directed to he illumination of such media by transmitting radiant energy thereto and reflecting the same therefrom.

In accordance with the present invention, however, acoustic impedance transitions in human or animal bodies are measured for identification and diagnostic purposes by exposing the body to acoustic energy pulses to produce echo pulses which are detected. The echo pulses are processed to indicate the relative specific acoustic impedance of the exposed body is a function of the time/distance relationship of the echo pulses relative to the body, thereby to enable the determination of the relative extent and position of irregularities in the body, for example.

The radiant energy detection and navigation art is replete with systems and techniques for making measurements for a myriad of purposes from the reflections or echoes of such energy transmitted to various media and objects; electromagnetic radiant energy and acoustic radiant energy being so used for continuous distance determination, for example, with the latter being more particularly used for underwater or underground detection, seismic prospecting and other purposes.

More specifically by using particular types of wave impulses and multiple receivers separated in the direction of transmission and reflection of the radiant energy waves, and through appropriate deconvolution of outgoing and returning waves and subsequent integration and appropriate display of the resulting reflection impulse-response function, entirely novel and different results are attained in that impedance transitions are interpretable, enabling not only delineation of discrete layers of the media, but also quantitative gradual shifts in acoustic impedance therebetween that provide discrimination in determining the nature and properties thereof.

Such results are useful in a host of applications including, for example, seismic prospecting, geological interpretation and identification, determination of the nature of reflective media, and, more generally, identification of the nature of otherwise unobservable, inaccessable, covered or otherwise hidden objects or other media, including, as further examples, reflective parts within human or animal bodies which have heretofore only been somewhat crudely outlined by acoustic reflection and related techniques.

For purposes of illustration, the invention will be hereinafter described in detail in connection with the exemplary use of acoustic radiant energy (and of preferred pulse types) useful for the illustrative examples of underwater seismic bottom-layer identification, the testing of laminates and the like, and the detection of reflective surfaces within human and animal bodies; though it is to be understood, as will be clear to those skilled in this art, that the novel method hereinvolved is equally applicable to other applications, including those above-mentioned and those outlined in the hereinafter-described prior patents and publications, and with other types of radiant energy, including electromagnetic waves, as well.

That acoustic impedance is a useful measure of normal sediment type, such that the measurement of specific acoustic impedance of an ocean bottom, for example, can be used to identify normal unconsolidated marine sediments, has previously been known, as described, for example, in the Bulletin of the Geological Society of America, Vol. 570, by E. L. Hamilton et al. Acoustic impedance can also be used to differentiate unconsolidated from consolidated sediments, or so called basement rock.

It is also well known by those experienced in the art that the specific acoustic impedance of any sediment can be greatly reduced by the presence of even small quantities of undissolved gas, such as are associated with organic decay within sediments. Accordingly, the direct quantitative measure of specific acoustic impedance, which is an objective of the illustrative example herein of the seismic application of the method underlying this invention, can be of further utility in the case of socalled "organic" sediments as a sensitive measure of undissolved gas content, thereby allowing rapid, remote, indirect measure of decay, which can be a valuable index of gas-producing sediment pollutant.

The use of the before-mentioned deconvolution techniques, generally, is not of itself new. Jens M. Hoven, for example, in a technical discussion entitled "Deconvolution for Removing the Effects of the Bubble Pulses of Explosive Charges" published on page 281, Vol: 47, of the Journal of the Acoustical Society of America, disclosed that frequency-domain deconvolution can be used for the quite different specific problem of removing redundant pulses associated with bubble pulse emissions. W. D. Moon et al in U.S. Pat. No. 3,489,996 also have employed similar techniques for removing surface-bottom multiples by deconvolution; and Bennett, in U.S. Pat. No. 3,344,396 has disclosed that substantially upgoing signals can be deconvolved with substantially downgoing signals to produce an amplitude-time signal which, in the terminology of linear circuits, may be termed a reflection impulse-response function, before-mentioned. The reflection impulse-response function is to be preferred because the process of deconvolution substantially improves the interpretability of the seismic waveforms by eliminating redundant and spurious events associated, for example, with multiple emissions by the source or wave transmitter, and multiple surface and bottom reflections.

In accordance with the present invention, however, use is made of impedance properties and deconvolution techniques in a novel method and apparatus for attaining vastly improved results in identifying and delineating the properties of media illuminated by radiant wave energy, such as the acoustic waves particularly applicable to diagnosis of human or animal bodies and to underwater seismic applications. Through the use of a preferred downgoing (incident) waveform and preferred sample timing, moreover, the results of deconvolution are substantially less sensitive to degradation as a result of so-called noise. Additionally, it has been found that by integrating the reflection impulse-response function, there results, unlike the prior art systems above-mentioned, a direct quantitative measure of specific acoustic impedance which, when appropriately interpreted, can be used, in the illustrative example of seismic applications, to identify sediments and/or to detect the presence and quantity of undissolved gas, such as is associated with organic decay. The relationships involved, furthermore, do not depend upon the existence of discrete steps in specific acoustic impedance and are, therefore, unlike prior systems, suited to identification of gradual impedance blends which are associated with transitions in sedimentary type, or gradually varying gas content in "organic" or polluted sediments.

A primary object of the invention, thus, is to provide a new and improved method of and apparatus for acoustic radiant energy measurement of impedance transitions for identification and delineation in human or animal body parts.

An additional object is to provide a novel diagnostic method of and apparatus for identifying and delineating the properties and nature of concealed objects within human or animal bodies and the like.

Other and further objects will be explained hereinafter and are more particularly delineated in the appended claims. In summary, however, in a preferred mode, the invention contemplates, in connection with the illustrative application of the invention to a non-invasive method of examination of body parts, for example, the steps of selectively ensonifying at least a portion of a body part with acoustic energy pulses in predetermined timed sequence to produce echo pulses, detecting said echo pulses, and processing said echo pulses to indicate the relative specific acoustic impedance of the thusly ensonified body part portion as a continuous function of the time/distance relationship of said echo pulses relative to said body part portion to thereby enable the determination of the relative extent and location of irregularities in said body part portion. Preferred techniques and details, as well as other applications of the invention, are hereinafter presented.

The invention will be described first with reference to a seismic application of the invention, and later with reference to the application of the invention to human and animal bodies. In the drawings.

FIGS. 2A, B and C are explanatory waveforms describing the performance of the system of FIG. 1;

Figure 1:
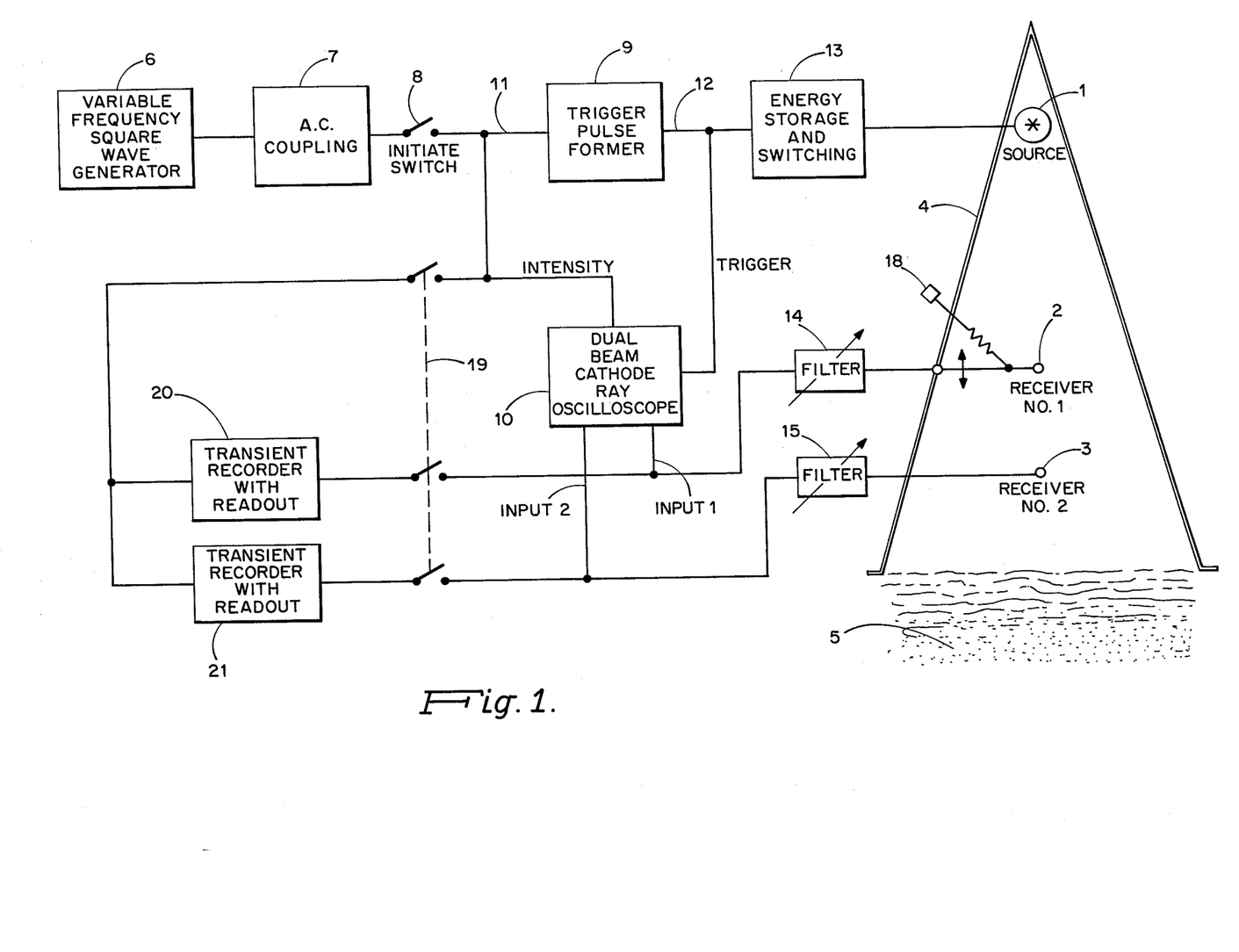
FIG. 1 is a schematic and block diagram of an embodiment of the invention.

Prior to describing the embodiment of FIG. 1, it is in order to lay a foundation for certain principles underlying the invention. From an analysis of errors resulting from so-called additive noise appearing in the returning wave echo, reflection or upgoing waveform, resulting from, say, downward transmission of radiant energy from a source to the reflecting medium, it has been found that if the "noise" is zero mean, uncorrelated and stationary, then the variance of the $p^{th}$ sample of the before-mentioned reflection impulse-response function is substantially reduced if the following criteria are followed:

First, data is preferably sampled at substantially the Nyquist, or minimum sampling rate. Secondly, sampling instants are preferably selected, or specifically prearranged (synchronized) so that the first nontrivial downgoing or transmitted-wave sample is substantially maximum. Thirdly, a transmitter or source is selected which will, as much as possible, result in a small (substantially less than unity) error parameter $E_p$, given substantially by the expression $$E_p = \sum_{s=n+2}^{P} (x_s/x_{n+1})^2, \quad (1)$$

where $x_s$ is the $s^{th}$ sample of the transmitted or downgoing waveform and $x_{n+1}$ is the first nontrivial downgoing wave sample.

It follows from the above that source-emitted pulse duration should not significantly exceed the reciprocal of the bandlimiting filter cut-off frequency. In the preferred embodiment of FIG. 1, thus, the source waveform, the filter cut-off frequency, the sampling rate and the initial sampling instant are selected so as substantially to reduce error in accordance with these criteria.

Referring to the application of FIG. 1, for example, the substantially downgoing transmitted and upgoing reflected waves must be used for deconvolution to obtain the previously mentioned true reflection impulse-response function. If two receivers or detecting means are vertically displaced as illustrated and later described in more detail, then the vertically traveling downgoing and upgoing waves can be extracted from the two observed waveforms at the two receivers, provided the acoustic travel time between the two receivers is known or observable. The advantages of a vertically displaced pair of receivers over more conventional so-called directive receivers is that the pair of receivers will effectively separate low-frequency waves which are of particular utility in applications such as seismic prospecting and the like. Sampling intervals are preselected readily to generate upgoing and downgoing waves, as later explained.

It has been found, in accordance with the invention, that the reflection impulse-response function, R(2t), corresponding to reflection from a region of modest continuous impedance change along the incident axis, is given by the expression $R(2t) \approx (dz/dt)/4z$; and its integral is given by the equation $$\int_{o}^{2t} R(a)da \approx \frac{1}{2} \ln[z(t)/z_o]; \quad (2)$$

where $z(t)$ is the relationship between impedance and acoustic travel time $t$, and $z_o$ is the specific acoustic impedance of the medium in which the receivers are located. In the preferred embodiment, the reflection impulse-response function is integrated to obtain the sediment or other medium acoustic impedance as a function of travel time, using substantially the relationship $$z(t) = z_o exp(2 \int_{o}^{2t} R(a)da).$$

In the seismic application, the specific acoustic impedance is used to determine sediment type or, alternatively, undissolved gas content, using relationships such as those of Hamilton (previously cited) and A. B. Wood in A Textbook of Sound, published by MacMillan Co. in 1955, describing a relationship between undissolved gas (air) content and acoustic velocity. Since bulk density is insignificantly affected by small volume percentages of undissolved gas, Wood's theory enables us to relate acoustic impedance (bulk density times longitudinal velocity) to gas content.

The details of the system of FIG. 1 will now be described in connection with the illustrative example of seismic underwater operations, though its direct application to other uses will be evident and later more fully discussed. An impulsive wave-transmitting source is shown at 1 supported by a framework 4 at its upper end, the base of which rests upon the medium 5 to be studied, such as bottom sediments or the like. Vertically positioned below the source 1 and supported by the frame 4 are at least two substantially colinear receivers 2 and 3, in turn vertically separated in separate planes from one another in the direction of downgoing radiant wave-energy transmission from the source 1 to illuminate the medium 5, and of opposite-direction upgoing reflection, echoing or return therefrom.

A variable frequency square-wave generator 6 is shown provided with a capacitive coupling output circuit 7 for generating a series of alternating polarity pulses, FIG. 2(A). Upon closure of an event-initiation switch 8, short alternate polarity pulses are thus introduced into both a trigger pulse former 9, via line 11, and the intensity (z-axis) modulation input of a dual beam cathoderay oscilloscope or other display 10. The trigger pulse former, upon receipt of a positive-going pulse in the input line 11, generates a single electrical pulse in the output 12, which serves both to trigger the source 1 through an energy storage power pack 13, and the triggering sweep of the display 10. The medium 5 becomes thus illuminated by the downgoing transmission from the source 1, and the upgoing reflections are received successively at the receivers 3 and 2, being filtered with respective so-called low-pass variable cut-off filters 14 and 15 and applied at Input$_1$ and Input$_2$ to the display at 10.

Figure 2:
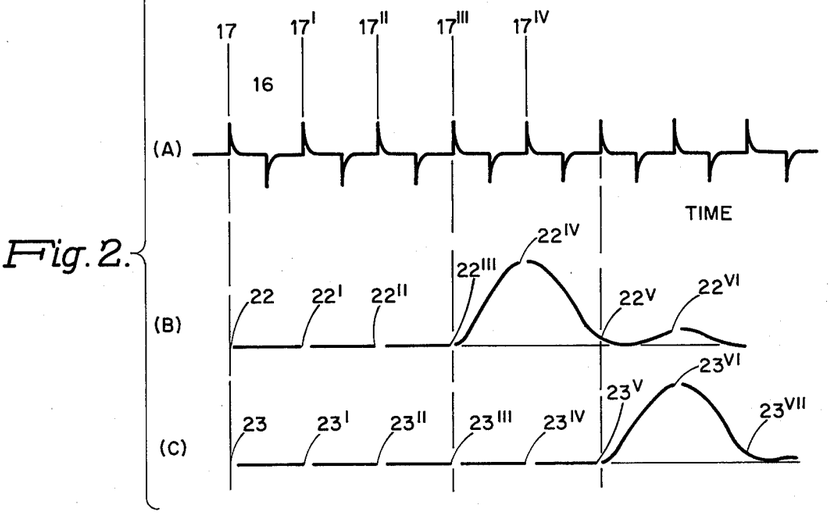

Upon each closure of the event-initiation switch 8, the received signal waveforms from receivers 2 and 3, which are thus effective for reception and display only during such sampling instants, are oscillographically displayed, with timing events appearing, for example, as variations in trace intensity. In a preferred embodiment, the frequency of the square-wave generator 6 is adjusted after each event so as to bring the observed waveforms into a preferred prealignment of synchronization, as shown and later described in connection with FIGS. 2B and C. In such synchronized condition, the periodic sampling interval shown at 16, FIG. 2A, has been successively adjusted until the first wave-signal arrival at the second receiver 3 is precisely $n$ times the reference interval 16, where $n$ is an integer (for example, $n=5$ in FIG. 2). For each sampled event, the time reference 17 corresponds to triggering of the source 1, and is the instant of the first positive going pulse, FIG. 2A, after closure of the event-initiation switch 8. If the upper receiver 2 has been properly positioned, the first wave-signal arrival will be precisely $m$ (integer) times the reference interval 16 (with $m$ equalling, say, 3 in FIG. 2). To attain these relationships, small final adjustments in the position of upper receiver 2 may be effected, if necessary, by an adjustable support arm 18. Once synchronization has been so achieved, the bandlimiting filters 14 and 15 are tuned or adjusted to substantially the so-called Nyquist frequency corresponding to a sampling interval equal to the reference interval 16. The recording or displaying switch 19 is then closed to enable digital recording and/or display at 10 of the reflected waves received at receivers 2 and 3 at simultaneous sample instants 17, 17', 17'', 17''', etc. using respective transient recorders 20 and 21.

Designating successive sample values of the waveform from receiver 2 as $P_0$, $P_1$, $P_2$, $P_3$, etc. (as shown by sample points 22, 22', 22'', 22''', 22$^{iv}$, etc. in FIG. 2B) and sampled values from receiver 3 as $q_0$, $q_1$, $q_2$, $q_3$, etc., (as indicated by points 23, 23', 23'', 23''', etc. in FIG. 2C), the following preferred, or substantially similar algorithms may be used numerically to compute the downgoing wave sample values $x_0, x_1, x_2, \ldots x_s \ldots$, and upgoing wave sample values $y_0, y_1, y_2, \ldots y_s$, as determined by the following expressions:

Table I $$x_s = \frac{m}{n} P_{s+m-n} - \frac{m(s-1-2n+2m)}{n(s-1-n+m)} [q_{s-2n+2m} - x_{s-2n+2m}]$$

$$Y_s = \frac{(s-1)}{n} [q_s - x_s]$$

$$P_s \equiv 0 \ (s \leq m); \text{ and}$$

$$q_s \equiv 0 \ (s \leq n).$$

Upgoing and downgoing waveforms $y_s$ and $x_s$ can be deconvolved by any of the so-called inverse filter techniques well known to those versed in the art as described, for example, in the before-cited publications. In a preferred technique, upgoing and downgoing waves are time-domain deconvolved, thereby avoiding errors associated with time truncation of waveforms, with the resulting reflection impulse-response function being integrated and the specific acoustic impedance determined therefrom theoretical means. The graphical display of impedance versus travel time then serves both to delineate layers of the medium 5, if present, such as to identify "normal" sediments in a marine bottom 5, and/or serve as a measure of undissolved gas content, if gassy (perhaps polluted), as previously noted.

Having obtained sampled values of the incident and reflected waves $x_s$, $y_s$ respectively, using the above or alternative techniques, deconvolution can be performed using either the following well known time-domain algorithm, or alternative means:

$$TR_p = y_p - \sum_{s=n+2}^{P} x_s TR_{p-1}/x_{n+1}, \tag{3}$$

where, $R_p$ is the $p^{th}$ sample of a bandlimited equivalent to the reflection impulse-response function sampled at intervals T second apart. Integration or the equivalent of integration is performed by algebraically adding successive values of $TR_p$ and the cumulative sum displayed (see, as an illustration, the Fourier Integral & Its Applications, A. Papoulis, McGraw-Hill, 1962, NYC, p. 502, on; with suitable techniques being of the type disclosed, for example, in The Fourier Transform and Its Applications, R. Bracewell, McGraw-Hill, 1965, NYC, p. 30, on).

Figure 3A:
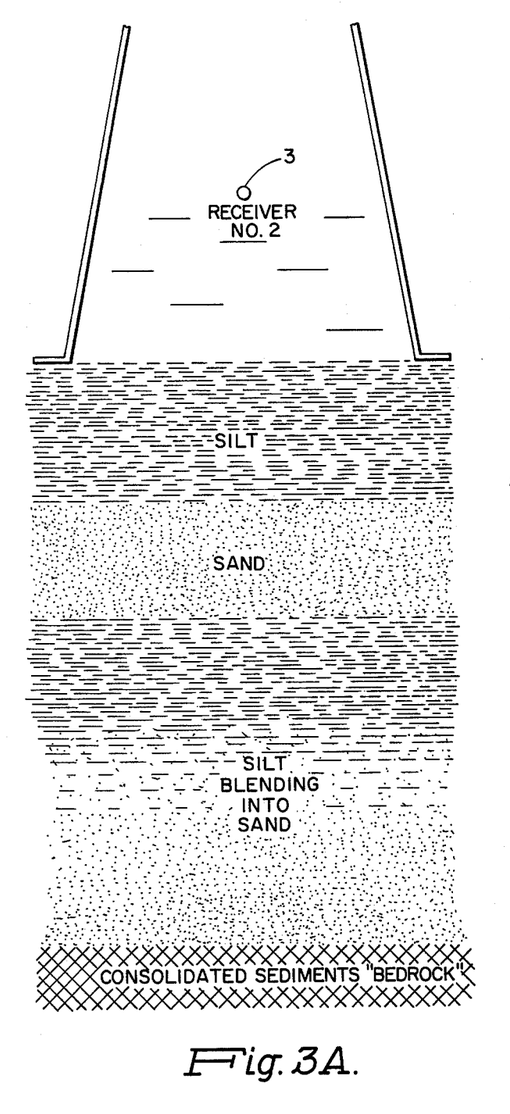
FIGS. 3B, 4B, 5A, and 5B are respectively diagrammatic views of displays produced by the invention and its correlation to bottom sediments, test results and the like, with the results of FIGS. 3B and 4B applying, respectively, to the applications shown in FIGS. 3A and 4A.
Figure 3B:
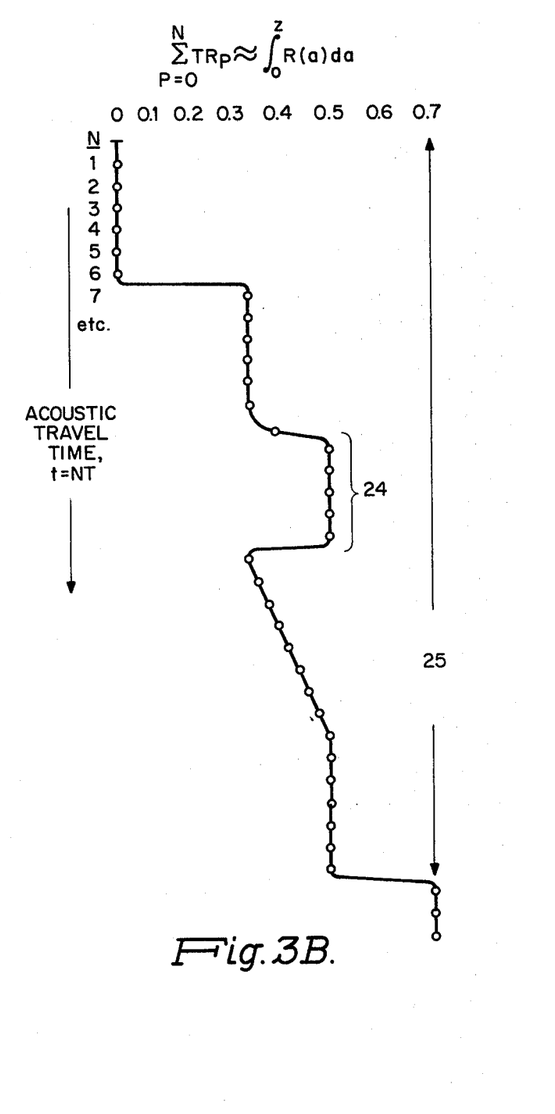

Referring to FIGS. 3A and B, a typical display of the integral of the reflection-response function, coined "impedogram", may be produced (FIG. 3B) in accordance with the present invention, having correlation with the actual layers identified within the bottom 5, FIG. 3A. The result is a graphical display, which in the case of unconsolidated sediments, delineates layers and also identifies the sediment type by use of the indicated quantitative level. For example, the buried "sand" layer in the sedimentary 5, FIG. 3A, appears as a rise in level 24, FIG. 3B, since the impedance of sand exceeds the impedance of silt. Further down, the gradational blending of silt through silty sand to sand is indicated by a gradual rise in the integral of the reflection impulse-response, of the impedogram. Similarly, reflection from "bedrock" or consolidated sediments, results in a rise to a quantitative level 25, FIG. 3B, which is too high (greater than say 0.5) for unconsolidated sediments and must therefore correspond to reflection from consolidated rock, such as sandstone, limestone, etc.

Figure 4A:
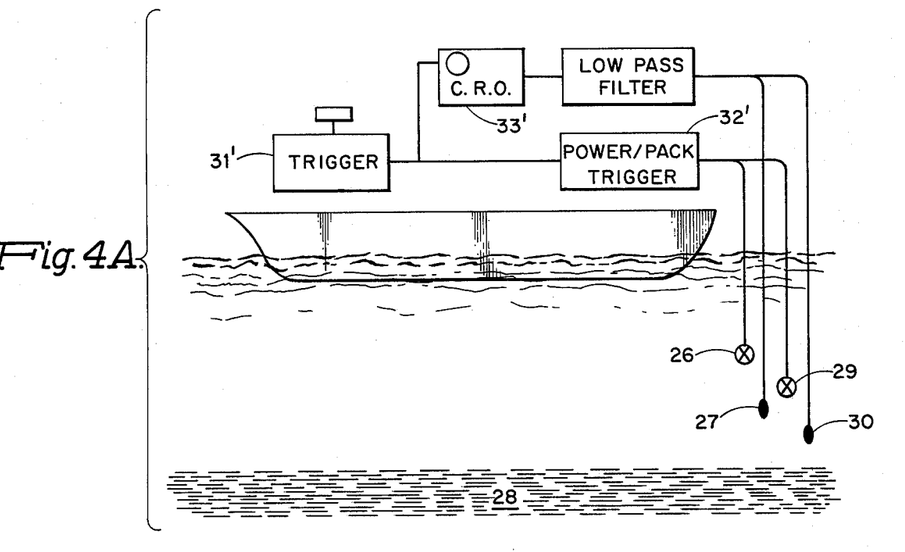

In an alternative or equivalent technique, measurements of the above type can be made using an impulsive source and one receiver, but making a pair of measurements at different relative receiver-and-bottom locations such that, in one measurement, the sediments are closer to the receiver than in the other. If the waveform emitted by the source is reproducible, then these two waveforms can be used to calculate the incident and reflected waveforms. For example, in a field test of the above technique, illustrated in FIG. 4, an electrodeless spark acoustic impulsive source 26, and Atlantic Research LC-32 hydrophone 27, were suspended by their cables over sediments 28, in the Great Harbor at Woods Hole, Massachusetts. Two measurements were made; first, with the receiver 27 about two feet above the silty bottom 28, and secondly with both impulse source and receiver lowered about 1.5 feet to positions 29 and 30, respectively, so that the receiver was perhaps 0.5 feet above the bottom.

Figure 4B:
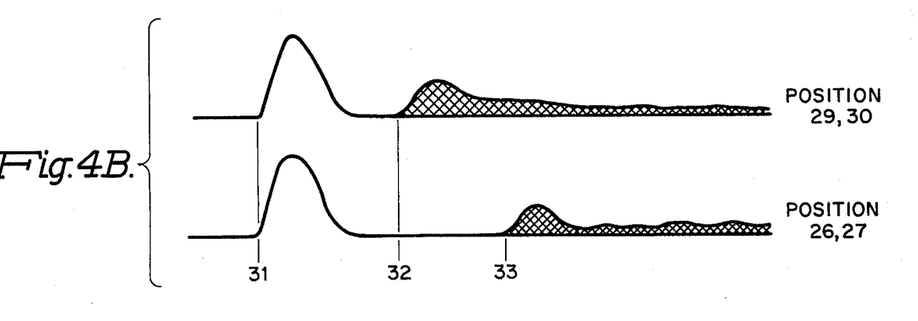

By comparing the two waveforms the incident and reflected waveforms were ascertained as follows. The waveform between instants 31 and 32, FIG. 4B, is the downgoing or incident waveform; whereas between instants 32 and 33, the difference between the two waveforms (shown cross hatched) is the reflected waveform.

This technique is less general than the twin receiver technique discussed previously in connection with the embodiment of FIG. 1, but it is simpler and suited to analysis of situations in which the incident waveform (not just source-emitted waveform) is reproducible within the time window of interest.

In field tests, the impulsive source was discharged by an electrical pulse generated by a trigger pulse circuit 31', which triggered a high voltage energy storage/trigger device 32', and horizontal sweep of a cathoderay oscilloscope 33'. Pressure waveforms indicated by hydrophone, 27, (30) were low-pass filtered by a Kron-Hite model 3202 electronic filter, displayed on a Tektronix 535 oscilloscope 33', and photographed with a Polaroid oscilloscope camera. The waveforms observed were substantially similar to those illustrated in FIG. 4. These bandlimited waveforms were sampled by reading values at periodic instants directly from the Polaroid photo. The deconvolution, timing and sampling techniques were as discussed above. By interpreting the reflection impulse-response function, the so-called impedogram was obtained of the first 1.5 feet of sediment at two different sites in Woods Hole harbor.

Figure 5A:
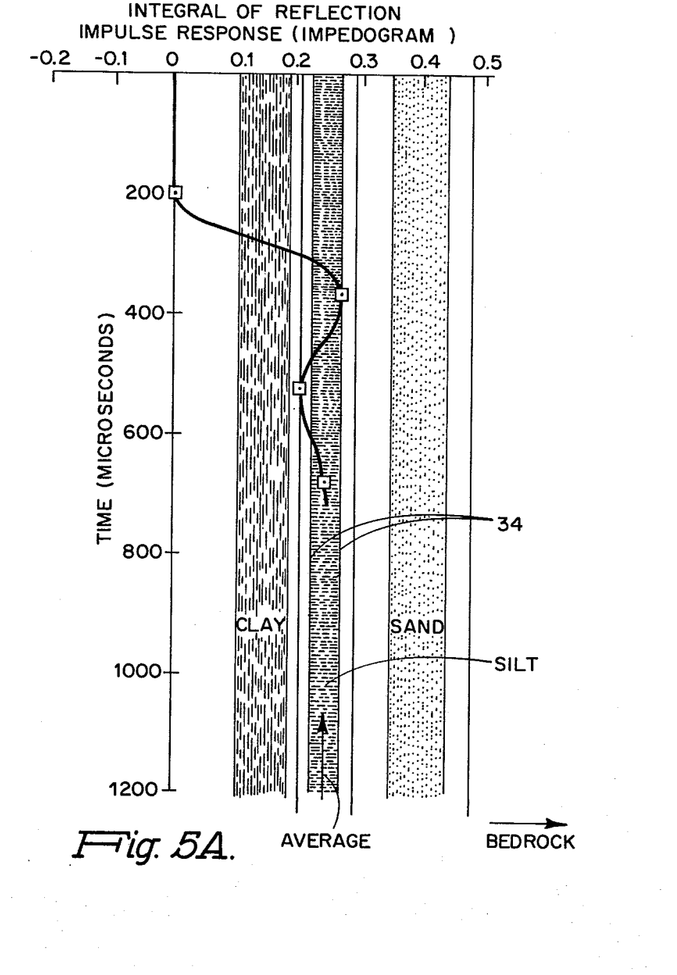
Figure 5B:
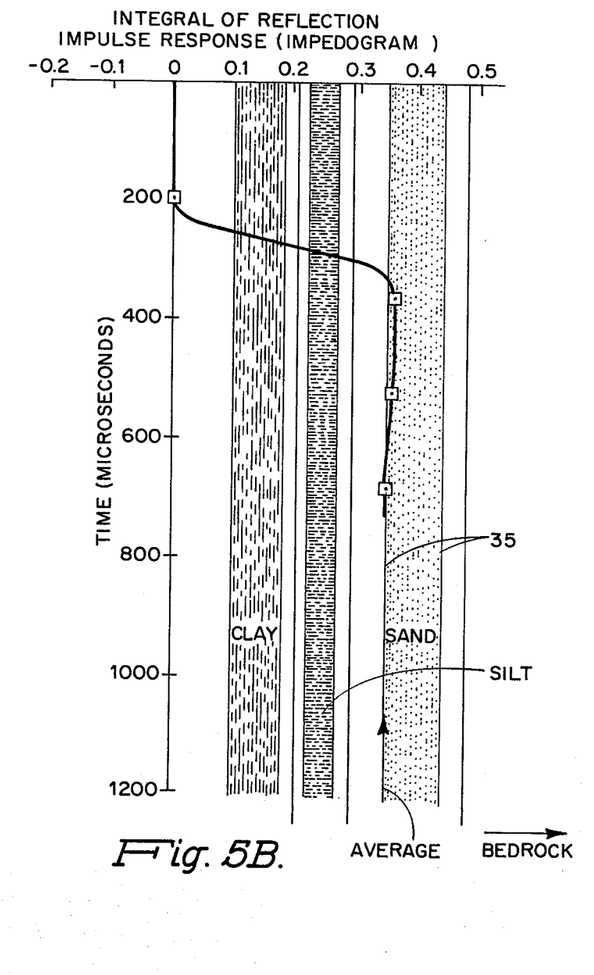

The experimentally observed impedogram over a silty bottom is shown in FIG. 5A, and a similar result was obtained over a sandy bottom, as shown in FIG. 5B. In each case, the actual nature of the bottom was determined by referring to published reports as well as direct visual inspection. In FIGS. 5A and 5B there are bands labeled silt 34, and sand 35, which were computed using equation (1) and the published values for "normal" marine sediments. A boundary between silt and sand is also indicated. It was found that in each case, the impedogram indicated "correct" quantitative levels corresponding to silt and sand, respectively, thereby demonstrating the reliability of acoustic identification of marine sediments, as discussed above. More precise results and greater penetration are obtainable with more sophisticated techniques, as previously discussed, also.

The novel results above-discussed, moreover, are all the more startling in view of the previous experience in the art with acoustic-wave diagnostic devices, which appeared to indicate the necessity for reflection reception in a single, closely-controlled plane. The displaced-plane, colinear, separate receiver technique of the invention, thus departing radically from such prior techniques and teachings, has enabled a substantial breakthrough in acoustic identification and delineation.

It is understood that, in addition to the above preferred technique, the accuracy of results may be improved by well-accepted techniques known to those versed in the seismic and related arts, as by operating the apparatus many times at a fixed location, with the waveforms appropriately added so that random, erroneous components will be preferentially suppressed. Useful sampling, adding and integrating techniques are described, for example, in the before-mentioned Fourier texts. The process of device synchronization, described above as a manual task, moreover, may be automated by techniques well known to those versed in circuit design, or numeric computations can be performed manually, as by using calculating machines or by more rapid automated computational means, as described, for example, in the PDP-10 Reference Handbook, Digital Equipment Corporation, 1969.

With an appropriate modification in the theoretical relationships, moreover, directive sources and/or receivers may also be used. Similarly, results from appropriately spaced, adjacent sites could be added so as preferentially to suppress events associated with rough, nonplanar interfaces. Successive measurements using progressively slower or faster sampling rates with correspondingly lower or higher filter cut-off frequencies may also be employed, and the results appropriately combined.

The configurational control associated with the rigid device described in connection with the embodiment of FIG. 1, furthermore, can be sacrificed if more complex sampling-rate and sampling-instant criteria are applied. In this event, less controlled devices may be used, including towed or moveable apparatus. Additionally, as before explained, the principles inherent in the method and apparatus discussed above can be readily applied to other technical areas to enhance information retrieval and intelligibility of reflected or transmitted wave processes, including radiant electromagnetic wave-energy systems of any spectral range from visible or invisible light through the radio, microwave and heat spectra. In such event, the source 1 of FIG. 1 may be an electromagnetic transmitter (laser, magnetron, etc.) and the receivers 2 and 3, appropriate corresponding detectors, as is well known. In the acoustic applications, moreover, using higher frequencies, shorter acoustic impulses and faster sampling rates, reflections from materials such as so-called laminates can be processed as above, and the resulting impedance vs. time display used for nondestructive diagnosis of, for example, poor laminate bonds resulting from such factors as gaseous inclusions and the like. Similarly, complex impedance profiles, such as might be expected to be associated with biological matter, such as blood clots, may be profitably examined substantially as above. In any of these alternative applications, the theoretical relationship between impedance and reflection impulse-response function can be extended to allow for high impedance layers, curvature, directivity or other considerations well known to those versed in acoustic, electromagnetic and seismic signal processing arts.

Figure 6:
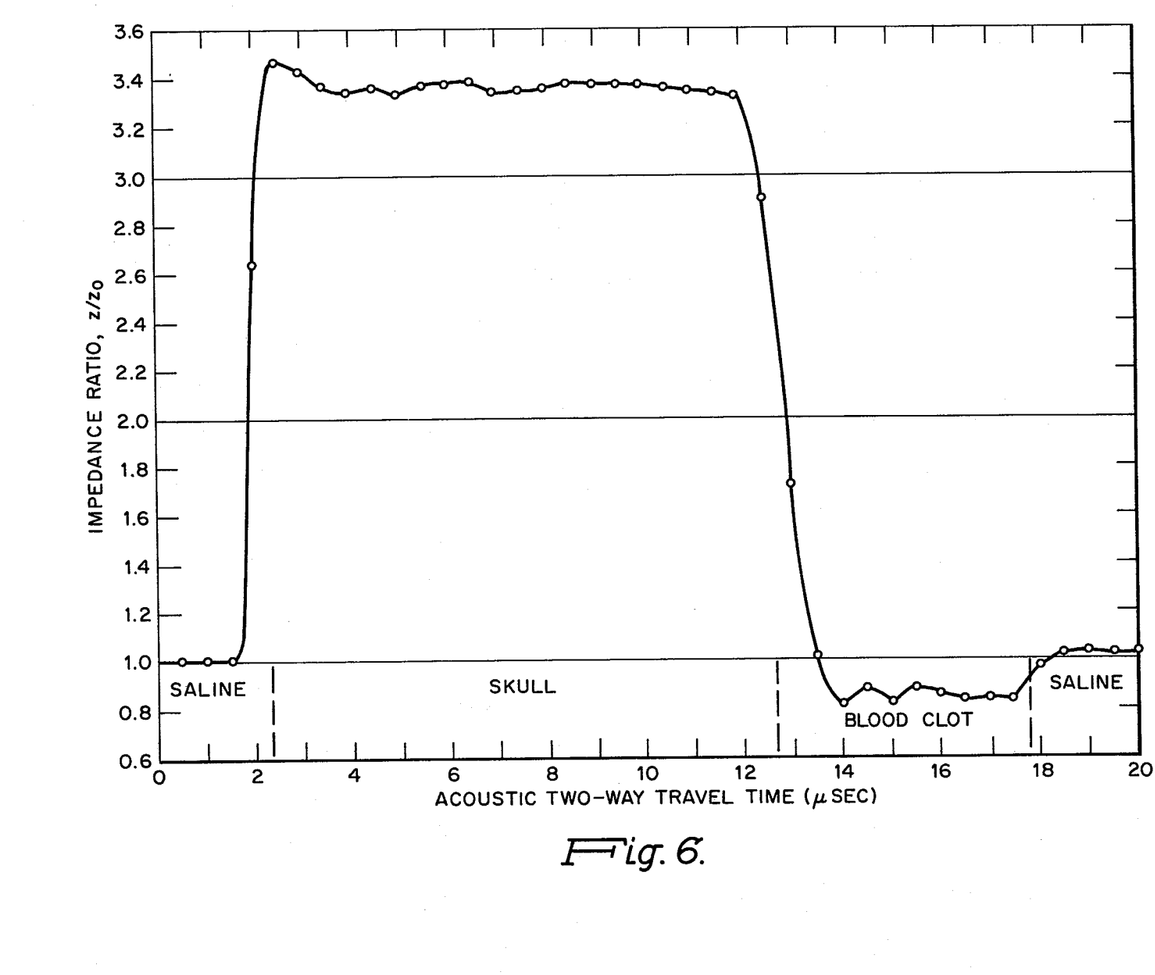
FIG. 6 is a similar view applied to reflections from within a skull of a body.

FIG. 6 illustrates still a further example of the utility of the above techniques, described orally by J. P. Jones at the 83rd meeting of the Acoustical Society of America 18–21 April, 1972 at Buffalo, New York. In a laboratory test using a fragment of human skull bone backed with a blood clot, incident and reflected pulses were deconvolved as discussed above, the resulting reflection impulse-response function integrated, and apparent impedance with respect to the ambient saline solution determined using the following approximate relationship:

$$\int_0^{2t} R(a)da \approx \tanh\left(\frac{1}{2}\ln Z(t)/Z_o\right) \quad (4)$$

More generically, for a monotonic increase in impedance, the following expression may be used with an iterative technique to correct for higher order terms as they arrive:

$$\int_0^{2nt} R(a)da \approx C_n\left(\frac{1}{2}\ln Z_p/Z_o\right),^{2n-1} \quad (5)$$

Where $C_n$ are coefficients in the small value expansion for $\tanh x$, and $R_{2n-1}$ is an $2n-1$ number reflection response.

It is apparent from FIG. 6 that the above-described techniques can be of great utility in the detection, localization, and quantitative measure of human or animal tissue. As a result, the technique is viewed as a valuable tool for applications such as diagnosis of intracranial hematomas (blood clots) and the like.

Similar results have been obtained, as before mentioned, in tests of materials such as bonded laminates of fiber reinforced plastic and rubber.

Additionally, scanning of the detection either mechanically or by electrical or electronic operation of a multiple array, by well-known techniques, may be employed to produce multi-dimensional displays, particularly useful for the diagnosis applications, above mentioned.

Further modifications will also immediately suggest themselves to those skilled in these arts, and all such are considered to fall within the spirit and scope of the invention as defined in the appended claims.

What is claimed is:

1. Apparatus for identifying and diagnosing parts within the human and animal bodies that comprises means for illuminating at least a portion of a body with acoustic impulse wave energy outgoing along a predetermined direction, whereby the wave energy is returned back in substantially the opposite direction from the body portion as a result of reflection therefrom, means responsive to the outgoing and returning wave energy to produce a resulting reflection impulse-response function, means for integrating the said reflection impulse-response function to provide a measure of impedance transitions in the body portion and means for correlating the same with body portion properties to identify the nature of said body portion.

2. A human and animal body-parts identifying and diagnosing apparatus as claimed in claim 1 and in which said function-producing means comprises means for effectively receiving the returning acoustic wave energy at sampling instants of time.

3. A human and animal body-parts identifying and diagnosing apparatus as claimed in claim 1 and in which said sampling instants are adjusted substantially to the Nyquist minimum sampling rate.

4. A human and animal body-parts identifying and diagnosing apparatus as claimed in claim 1 and in which said sampling instants are selected so that the first nontrivial acoustic wave sample outgoing to said body portion is substantially maximum.

5. A human and animal body-parts identifying and diagnosing apparatus as claimed in claim 1 and in which the waveform of the acoustic wave energy illuminating said body portion is adjusted to produce a relatively small error parameter Ep is given substantially by the expression $$Ep = \sum_{s=n+2}^{p} (x_s/x_{n+1})^2,$$

where $x_s$ is the $s^{th}$ sample of the illuminating acoustic energy waveform, $x_{n+1}$ is the first nontrivial outgoing acoustic wave sample, and $n$ is an integer.

6. A human and animal body-parts identifying and diagnosing apparatus as claimed in claim 1 and in which receiving means is provided with means for effecting the receiving within a bandlimiting cut-off acoustic frequency, and in which the acoustic wave energy illuminating means comprises means for generating wave energy of substantially unipolar impulse form and of pulse duration adjusted not significantly to exceed substantially the reciprocal of the said bandlimiting cut-off acoustic frequency.

7. A human and animal body-parts identifying and diagnosing apparatus as claimed in claim 1 and in which said sampling means is adjusted substantially in accordance with the algorithm criteria of Table I herein.

8. For use in identifying and diagnosing parts in human and animal bodies and the like, apparatus having, in combination, a source of acoustic wave energy provided with means for directing the same outgoing along a predetermined direction to illuminate at least a predetermined portion of a body with such energy; wave energy receiving means positionable between said source and said body portion in the path of such illumination to receive the reflected energy returning in the opposite direction from said body portion at least at two locations differently spaced from said body portion; means connected with said receiving means for deconvoluting the outgoing and returning wave energy to produce a resulting reflection impulse-response function; means responsive to the deconvoluting means for integrating the said reflection impulse-response function to provide a measure of impedance transitions in the body portion; and display means connected to indicate the integrated function and enable correlation of the same with body portion properties to identify the nature of said body portion.

9. For use in identifying and diagnosing parts in human and animal bodies and the like, apparatus as claimed in claim 8 and in which said source comprises means for generating substantially unipolar time-assymetric acoustic impulses.

10. For use in identifying and diagnosing parts in human and animal bodies and the like, apparatus as claimed in claim 9 and in which said receiving and deconvoluting means are responsive to and controlled by sampling means adjusted to at least one of the Nyquist minimum sampling rate, and sampling instants such that the first nontrivial outgoing wave sample is substantially maximum.

11. For use in identifying and diagnosing parts in human and animal bodies and the like, apparatus as claimed in claim 9 and in which the said source is provided with means for adjusting the waveform of the illuminating acoustic wave impulse energy to produce a relativey small error parameter Ep given substantially by the expression $$Ep = \sum_{s=n+2}^{p} (x_s/x_{n+1})^2,$$

where $x_s$ is the $s^{th}$ sample of the illuminating waveform, $x_{n+1}$ is the first nontrivial outgoing acoustic wave impulse sample, and $n$ is an integer.

12. For use in identifying and diagnosing parts in human and animal bodies and the like, apparatus as claimed in claim 9 and in which said sampling means is adjusted substantially in accordance with the algorithm criteria of Table I herein.

13. In a method for the non-invasive examination of body parts, the steps of, selectively ensonifying at least a portion of a body part with acoustic energy pulses in predetermined timed sequence to produce echo pulses, detecting said echo pulses, and processing said echo pulses to indicate the relative specific acoustic impedance of the thusly ensonified body part portion as a continuous function of the time/distance relationship of said echo pulses relative to said body part portion to thereby enable the determination of the relative extent and location of irregularities in said body part portion.

14. In a method as in claim 13 further comprising, the steps of displaying said impedance indications to provide an impedance profile of the thusly ensonified body part portion.

15. In a method for the non-invasive examination of body parts, the steps of selectively ensonifying at least a portion of said body part with acoustic energy pulses in predetermined timed sequence to produce echo pulses, detecting said echo pulses sequentially and selectively by scanning said portion, processing said echo pulses to convert the same to electrical signals indicative of the relative specific acoustic impedance of the thusly ensonified body part portion as a continuous function of the time/distance relationship of said echo pulses relative to said body part portion, accumulating said electrical signals, and spatially displaying the electrical signals resulting from each of said scans on a display device to provide a visualization of said body part portion and thereby enable the determination of the configuration, and of the relative extent and position, of irregularities in said body part portion.

16. In apparatus for the non-invasive examination of body parts, means for selectively ensonifying at least a portion of a body part with acoustic energy pulses in predetermined timed sequence to produce echo pulses, means for detecting said echo pulses, and means for processing said echo pulses to indicate the relative specific acoustic impedance of the thusly ensonified body part portion as a continuous function of the time/distance relationship of said echo pulses relative to said body part portion to thereby enable the determination of the relative extent and position of irregularities in said body part portion.

17. Apparatus as in claim 16 further comprising, means to display said impedance indications to provide an impedance profile of the thusly ensonified body part portion.

* * * * *